United States Patent [19]
Jibbe et al.

[11] Patent Number: 5,136,652
[45] Date of Patent: Aug. 4, 1992

[54] AMPLITUDE ENHANCED SAMPLED CLIPPED SPEECH ENCODER AND DECODER

[75] Inventors: Mahmoud K. Jibbe; Robert A. DeMoss; Elmer A. Hoyer; Merle E. Furry, all of Wichita, Kans.

[73] Assignee: NCR Corporation, Dayton, Ohio

[21] Appl. No.: 798,057

[22] Filed: Nov. 14, 1985

[51] Int. Cl.⁵ .......................... H04N 7/12; H04B 7/00
[52] U.S. Cl. .................................. 381/31; 370/69.1; 375/25
[58] Field of Search .......................... 381/29-40; 370/69.1, 123; 375/25-38

[56] References Cited

U.S. PATENT DOCUMENTS

| | | | |
|---|---|---|---|
| 3,974,336 | 8/1976 | O'Brien | 381/47 |
| 4,015,088 | 3/1977 | Dubnowski et al. | 381/49 |
| 4,047,108 | 9/1977 | Bijker et al. | 381/31 |
| 4,070,550 | 1/1978 | Miller, Jr. et al. | 370/8 |
| 4,271,332 | 6/1981 | Anderson | 381/36 |
| 4,477,925 | 10/1984 | Avery et al. | 381/43 |

Primary Examiner—Steven L. Stephan
Assistant Examiner—Emanuel T. Voeltz
Attorney, Agent, or Firm—Douglas S. Foote; Edward Dugas

[57] ABSTRACT

An encoder and a decoder is provided with each being usable independently of each other for improving the dynamic range of clipped speech digital systems by providing amplitude components to the clipped digital signal. The encoder processes an audio input signal along two signal paths, the first signal path including a clipper and digitizer means for forming a digitized clipped signal. The second signal path includes a rectifier, envelope detector and digitizing means for forming a digitized signal having amplitude components. Both digitized signals may then be transmitted to the decoder for reconstruction or stored for reconstruction at a later time.

27 Claims, 16 Drawing Sheets

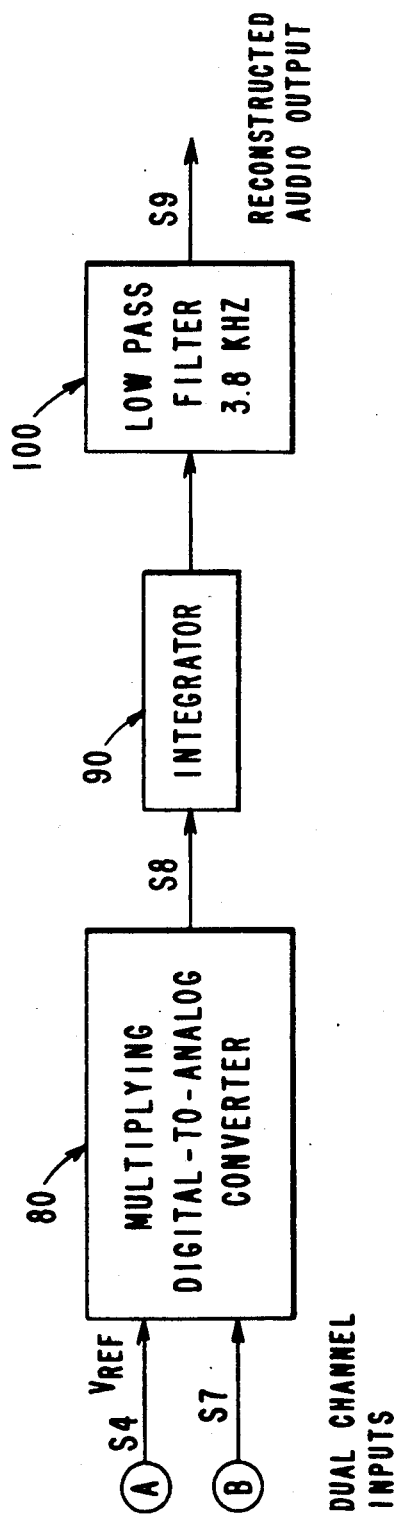

SIGNAL S1. AUDIO INPUT
AMPLITUDE VERSUS TIME

SIGNAL S2. DIFFERENTIATED AUDIO
AMPLITUDE VERSUS TIME

SIGNAL S3. CLIPPER OUTPUT
AMPLITUDE VERSUS TIME

SIGNAL S4. SAMPLED CLIPPER OUTPUT
AMPLITUDE VERSUS TIME

SIGNAL S5. RECTIFIED AUDIO
AMPLITUDE VERSUS TIME

SIGNAL S6. ENVELOPE TRACKER OUTPUT
AMPLITUDE VERSUS TIME

SIGNAL S7. DIGITIZED ENVELOPE
AMPLITUDE VERSUS TIME

SIGNAL S8. MULTIPLYING D/A OUTPUT
AMPLITUDE VERSUS TIME

SIGNAL S9. RECONSTRUCTED AUDIO (AE-SCS) AMPLITUDE VERSUS TIME

AMPLITUDE ENHANCED SAMPLED CLIPPED SPEECH ENCODER AND DECODER

BACKGROUND OF THE INVENTION

The present invention relates generally to the field of digital transmission systems for transmitting speech signals and somewhat more specifically to the field of conditioning speech signals so that they can be used as inputs to computerized systems. More particularly, the present invention converts an analog speech signal into digital data and vice versa, using clipped signal techniques.

Ordinary sampled clipped speech signals have an unnatural sound and are fatiguing to listen to over long periods of time. It is therefore desirable to process these types of signals in such a way that the components, generally amplitude components, that would add to the quality of the reproduced speech signals are added to and made a part of the sampled clipped signal.

A publication of interest for its teachings of conditioning speech signals is entitled "Automatic Conditioning of Speech Signals", IEEE Trans. Audio Etc., June 1968, pp. 169-179, by G. Hellworth et al. In that paper, it is disclosed that an analog signal may be digitized and the amplitude clipped with the result that the remaining signal will still bear a resemblance to the original signal such that, if a speech signal, the signal may be processed to produce recognizable speech.

A patent of interest for its teaching on clipped speech signal processing is U.S. Pat. No. 4,477,925, entitled "Clipped Speech-Linear Predictive Coding Speech Processor", by J. M. Avery et al. and assigned to NCR Corporation, the assignee of the present application. In such patent, there is disclosed a system and a method which analyzes sampled clipped speech signals for purposes of identifying the original utterance. A sampler generates from the clipped signal a plurality of discrete binary values. A processor is used to analyze the sampled binary values to compare them against stored digitized signals corresponding to a known spoken utterance. Comparisons are made using linear predictive coefficients of an autocorrelation function of the utterances.

Another patent of interest is U.S. Pat. No. 4,015,088, entitled "Real-Time Speech Analyzer", by J. J. Dubnowski. The analyzer disclosed in this patent analyzes digital signal representations of a speech signal, which signals are threshold center-clipped and infinite peak-clipped to form a signal comprising three logic states. An autocorrelation function of the signal is determined by a circuit which then employs circuitry for continuously determining the pitch period of the applied speech signal.

Another patent of interest for showing the state of the art of speech processing using clipping is U.S. Pat. No. 3,974,336, entitled "Speech Processing System", by E. M. O'Brien. In this patent, it is taught that speech signals can be quantized in amplitude and time and a square wave squelch signal of relatively high frequency can be added and the sum amplified, clipped and quantized in time. By utilizing the proper detection circuitry and the squelch signal, the speech signal can be separated and cleanly removed from noise signals which occur between words.

Another patent of interest for its showing of a method for digitizing clipped speech and for squelching noise between words is U.S. Pat. No. 4,271,332, entitled "Speech Signal A/D Converter Using an Instantaneously—Variable Bandwidth Filter", by James C. Anderson.

Another patent of interest for its teaching is U.S. Pat. No. 4,070,550, entitled "Quantized Pulse Modulated Nonsynchronous Clipped Speech Multichannel Coded Communication System", by R. H. Miller, Jr. et al. In FIG. 5 of such patent, the process of speech clipping and digitizing an analog input waveform to arrive with a digitized rectified signal is shown in block and waveform illustrations.

As previously mentioned, clipped speech signals have a very flat sound with noise between words which is unnatural and fatiguing to listen to. It therefore would be desirable to have a system which utilizes the advantages of clipped speech signal processing but which adds to the reconstructed signal amplitude information for reconstructing the naturalness and dynamic range of the reconstructed signal.

SUMMARY OF THE INVENTION

The present invention is directed to an encoder and a decoder which may be used independently for providing clipped speech digital signals with a natural sound inclusive of an improved dynamic range and a method therefor.

The encoder of the subject invention receives as an input an audio signal which signal is processed along two signal paths, the first having a differentiator for differentiating the audio input signal, a clipper for clipping the differentiated signal and a digitizer for digitizing the differentiated and clipped audio signal to provide at its output a digitized clipped signal. The second signal path is comprised of a full-wave rectifier for rectifying the differentiated audio input signal, an envelope tracker for tracking the envelope of the rectified signal and an analog-to-digital converter for converting the envelope amplitude into a digitized output signal having amplitude variations. A clock means clocks the digitizer at a first rate and the analog-to-digital converter at a second slower rate. The encoder provides at its output the two signals, one being the digitized clipped signal and the other being the amplitude modulated digital output signal. The two digital channels may be multiplexed into a single digital channel, if so desired, by any of several appropriate multiplexing means known by persons skilled in the art of signal processing. One such multiplexing means along with a demultiplexing means is presented with this invention.

The encoder output, whether as two separate signal channels or as a single multiplexed channel, may be applied to a processing system for storage or analysis, or it may be directed immediately to the decoder for reconstruction of the audio speech signal. (If the encoder output has been multiplexed into a single channel, then prior to decoding, the receiving end will first provide the appropriate demultiplexing to recover the two digital channels previously mentioned.)

The decoder of the subject invention receives the two channel signals and applies them to a multiplying digital-to-analog converter, where the received digitized clipped speech signal (a binary signal) is amplitude modulated by the received digitized amplitude signal (typically PCM). The output of the analog converter is then directed to an integrator and low pass filter for audio reconstruction.

From the foregoing, it can be appreciated that the system of the present invention operates to provide amplitude signal components to a clipped digital signal to achieve a reconstructed speech signal having the characteristics of naturalness and dynamic range.

BRIEF DESCRIPTION OF THE DRAWINGS

FIG. 3 is a block diagram of the decoder of the present invention.

DESCRIPTION OF THE PREFERRED EMBODIMENT

Figure 1:
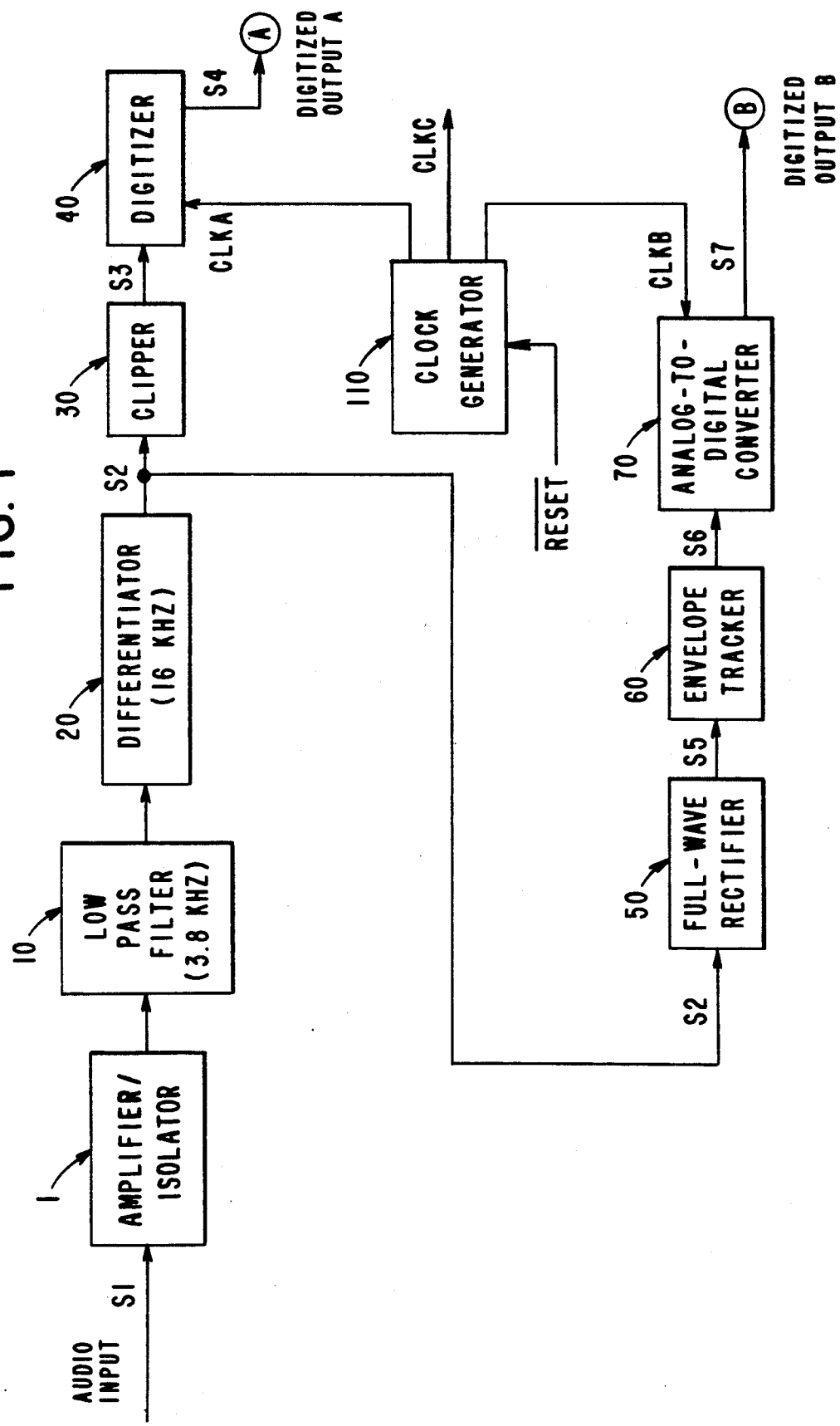
FIG. 1 is a block diagram of the encoder of the present invention.
Figure 4A:
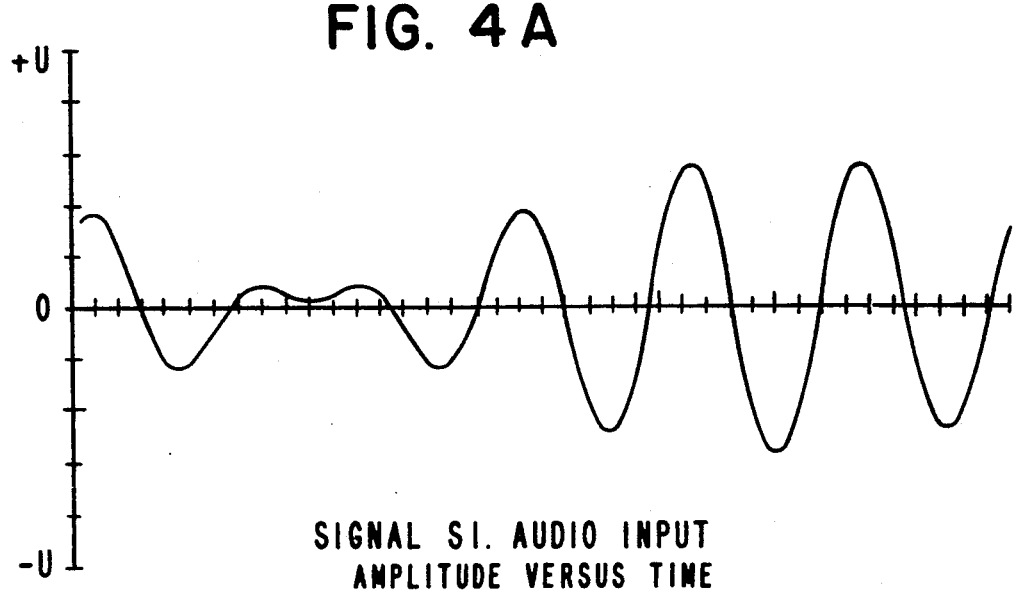
FIGS. 4A-4I illustrate a set of waveforms that represent signals taken at selected points (labeled S1 through S9) in the encoder and decoder block diagrams of FIGS. 1 and 3).
Figure 4B:
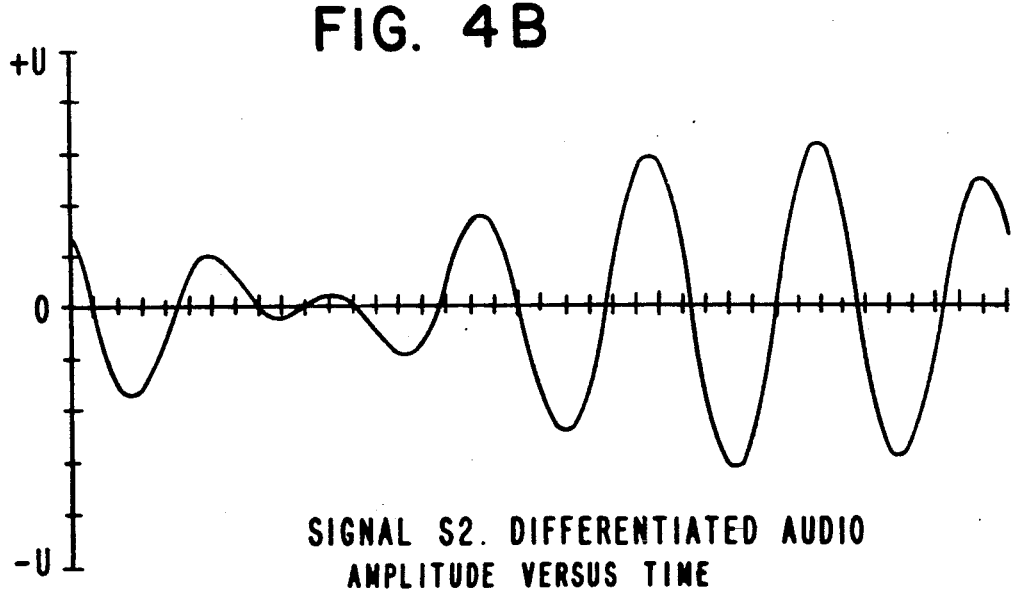
Figure 4C:
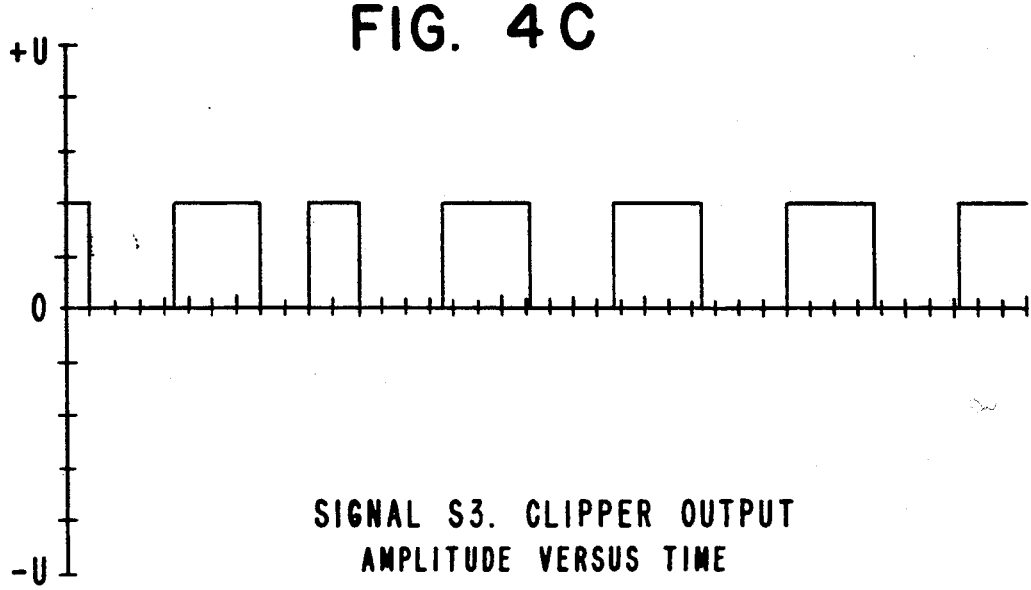
Figure 4D:
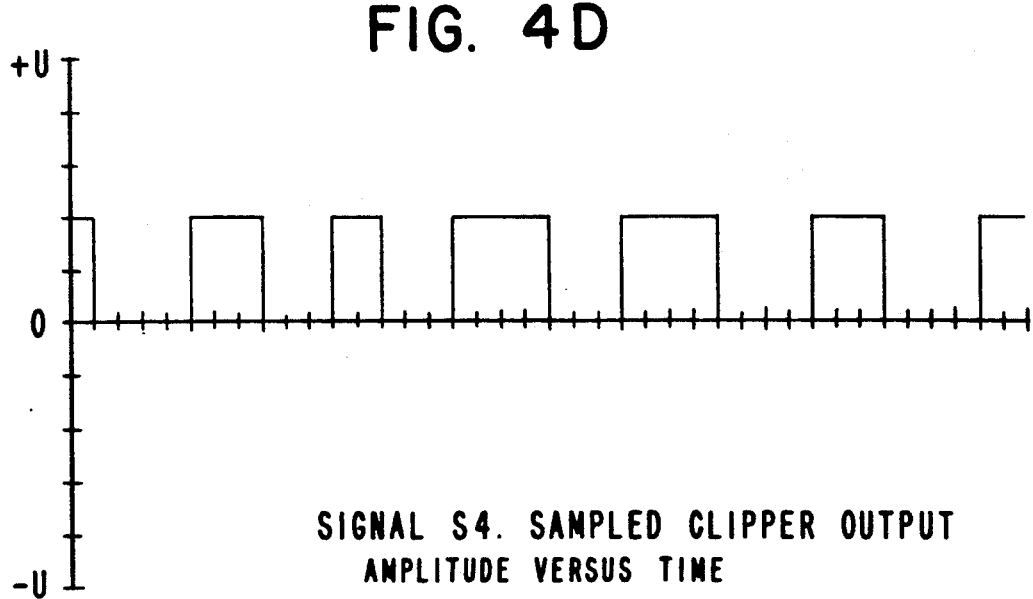
Figure 4E:
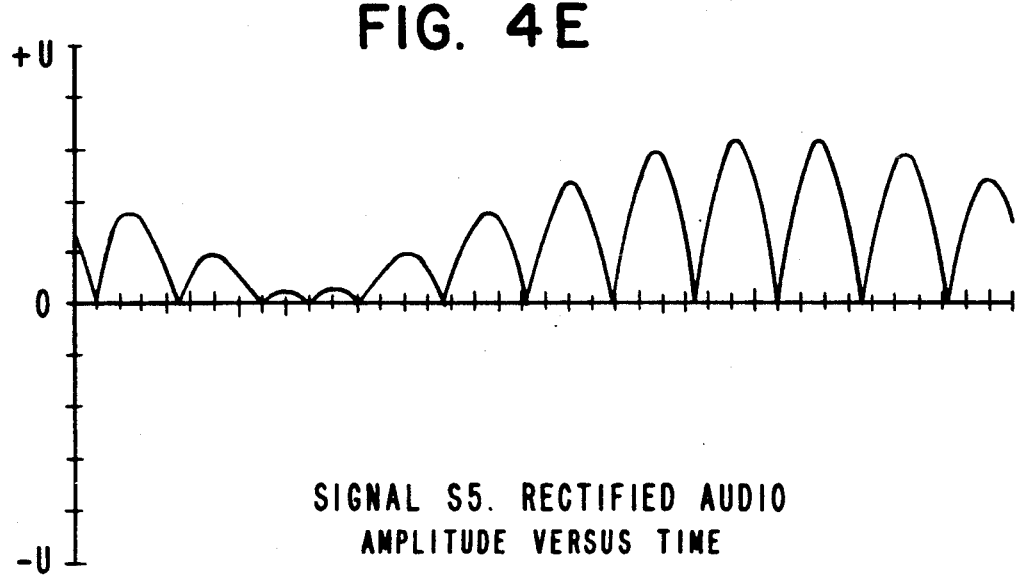
Figure 4F:
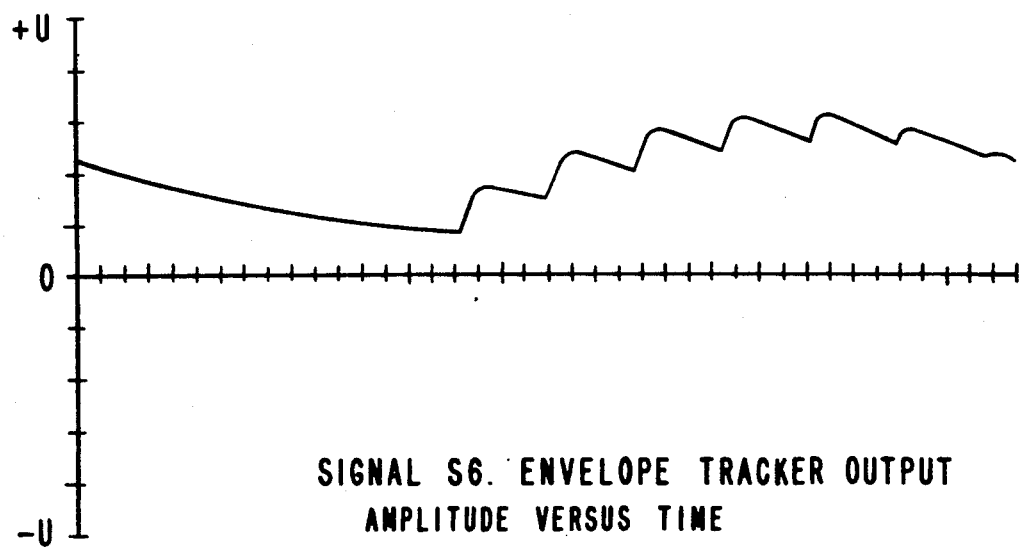
Figure 4G:
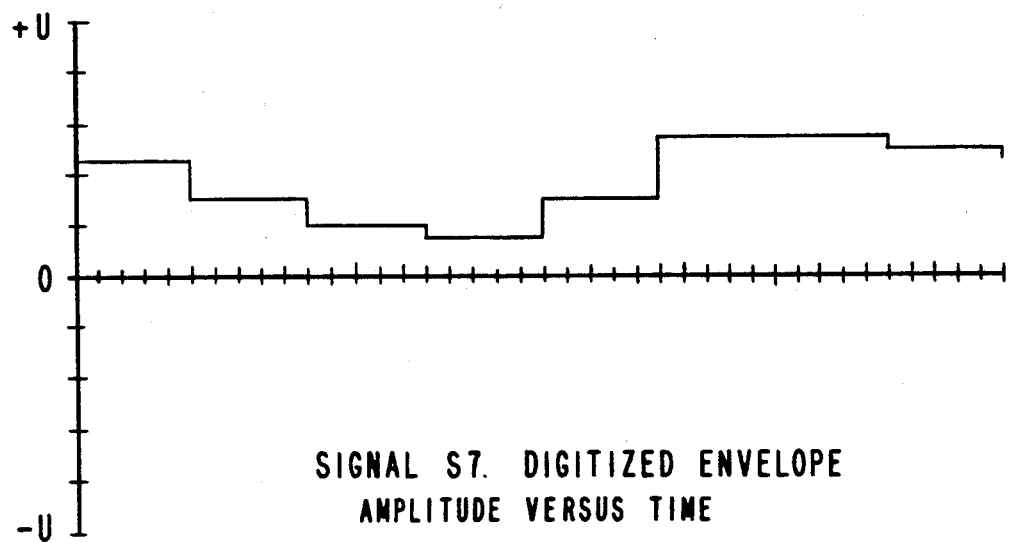

Referring to FIG. 1, the analog speech signal (AUDIO INPUT shown as the waveform S1 in FIG. 4A) is applied to the input of an audio amplifier/isolator 1. The output signal from the amplifier is directed to the input of an active low pass filter 10 which, in the preferred embodiment, cuts off signal frequency components above 3800 Hz and has a unity gain in the pass band. The low pass filter functions to remove unwanted components in the audio signal that lie outside of the effective frequency band of speech. It is also used to prevent or minimize aliasing that would result from the process of sampling. The filtered output signal is directed to a differentiator circuit 20 which is a high pass filter, with a 3 dB frequency at 16 kHz and an asymptotic slope of 6 dB per octave. The differentiator greatly improves the intelligibility of the clipped speech signal from what would otherwise be obtained from not differentiating. The differentiated signal S2, shown in FIG. 4B, from differentiator 20 is then applied to an infinite clipper 30. The infinite clipper 30 operates to produce a high or low level output signal S3, shown in FIG. 4C, depending on the polarity of the input at the time; and so it thereby preserves all the zero crossings of its input signal. The clipped output signal S3 is directed to a digitizer 40 which is clocked by a clocking signal CLKA, derived from a clock circuit 110, so as to uniformly sample the clipped output signal from the clipper 30. The output signal S4, shown in FIG. 4D, of digitizer 40 is thus a serial bit stream, which is a first digitized output signal of the encoder and which is directed to a first encoder output terminal labeled Ⓐ. In the preferred embodiment, the bit rate of the binary signal appearing at terminal Ⓐ is 8000 bits per second, though rates above or below this value may be used. If a rate below 8000 bits per second is used, aliasing effects begin to intrude; however, the reconstructed speech from the decoder is quite intelligible down to a rate of 4000 bits per second. The encoder discussed so far constitutes a first signal path for the audio input signal. A second signal path is provided by the connection between the input to a full-wave rectifier 50 and the output from the differentiator 20. The rectifier performs a full-wave rectifying function upon its input signal and provides the rectified signal S5, shown in FIG. 4E, as an input to an envelope tracker 60. In the preferred embodiment of the invention, the envelope tracker has a fast attack (approximately 10 microsecond time constant) and slow decay (approximately 15 millisecond time constant). The output signal S6, shown in FIG. 4F, from the envelope tracker 60 is fed to an analog-to-digital converter 70 which is clocked by a clocking signal CLKB, of approximately 300 Hz or more, derived from the clocking circuit 110. The output signal S7, shown in FIG. 4G, generated by the converter 70 is a second digitized amplitude information signal which is directed to a second encoder output terminal, labeled Ⓑ. The signals present at the output terminals Ⓐ and Ⓑ may now be processed in a number of manners, one of which is to store the signals in a computerized system for later recovery and decoding into an audio signal. Another possible application of the encoder output is for speech analysis or recognition. At this point it can be appreciated that the digitizing method for the amplitude information has been pulse code modulation (PCM). Other digitizing schemes may be utilized without detracting from applicants' contribution.

Figure 2:
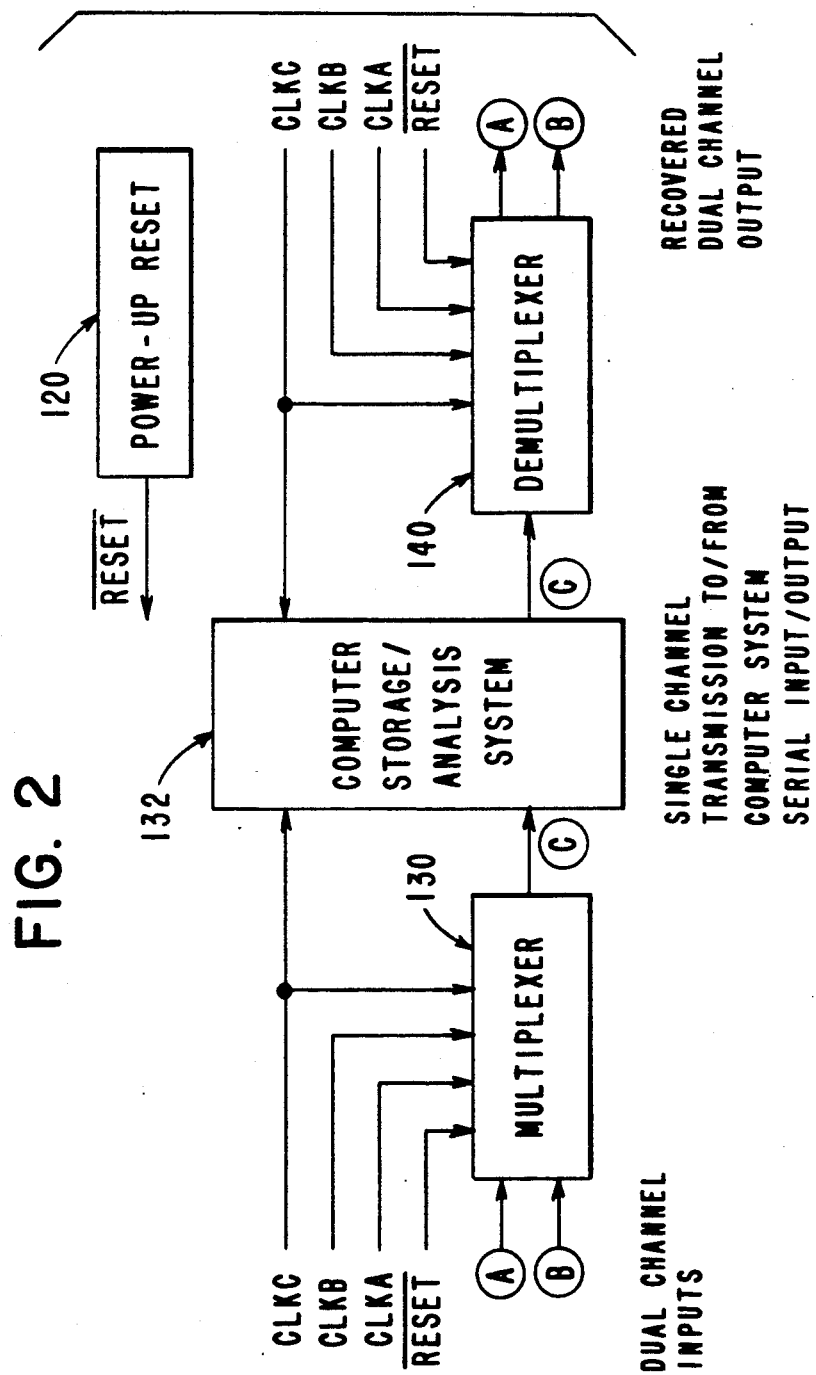
FIG. 2 is a block diagram of a multiplexer/demultiplexer that may be used with the system for transmitting the encoded data in a single channel format convenient for computer input, output and storage.

Referring to FIG. 2, the block diagram of an optional miltiplexer/demultiplexer is shown, utilizing the clock signals CLKA, CLKB, and CLKC from the clock generator 110 of the encoder of FIG. 1. A power-up reset circuit 120 is provided to generate a reset signal RESET to the clock generator 110, the multiplexer 130 and the demultiplexer 140, in order to establish the system in a known state after power-up. The multiplexer 130 receives the two channel signals from the encoder terminals Ⓐ and Ⓑ and multiplexes them into a single serial bit stream, labeled Ⓒ, which is synchronous to clock signal CLKC. The single channel signal may then be applied to a computer system 132 for storage or analysis via a serial input port. At some later time, the stored or analyzed signal may be retrieved the computer system via a serial output port. The received serial signal Ⓒ, at that time, is then directed to the demultiplexer 140 which recovers the two channel signals that were previously multiplexed and applies them to the output terminals Ⓐ and Ⓑ.

Figure 4H:
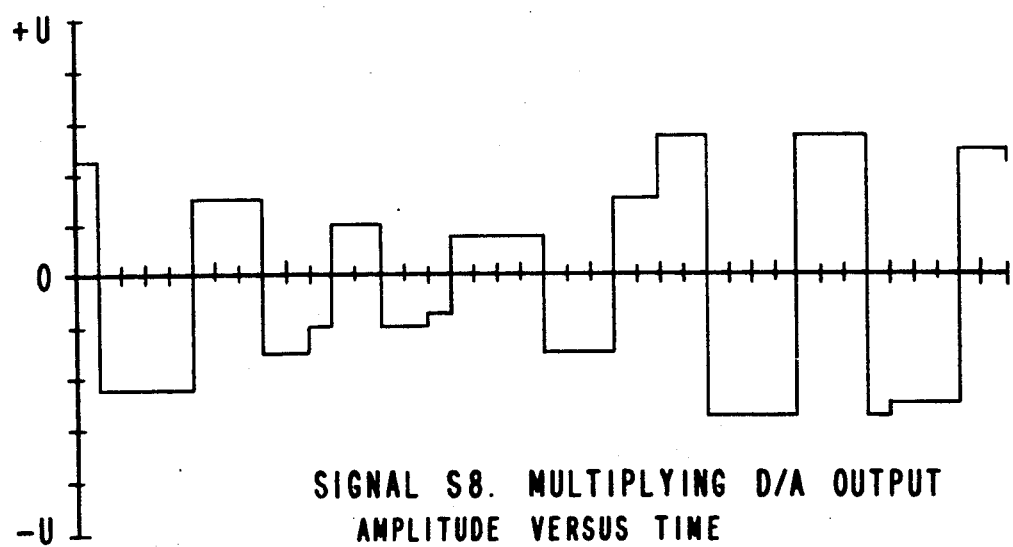
Figure 4I:
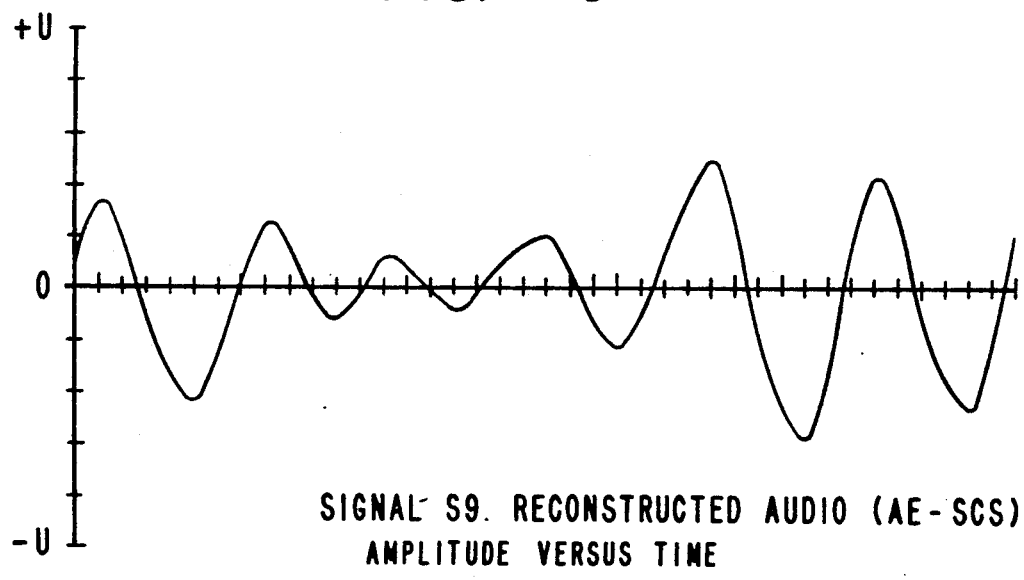

Referring now to FIG. 3, the block diagram of the decoder is illustrated, which decoder may be utilized in conjunction with the encoder of FIG. 1. The decoder receives the two signals from the encoder terminals Ⓐ and Ⓑ, either directly from the encoder, or after storage, or after a multiplexing/demultiplexing process. The input terminal Ⓐ receives the corresponding signal, labeled S4, originating from the encoder, which is the sampled clipped- speech signal, and applies the signal to the reference terminal of a multiplying digital-to-analog converter 80. The input terminal Ⓑ receives the corresponding signal, labeled S7, originating from the encoder, which is the digitized speech amplitude signal (typically PCM), and applies the signal to the multiplying input of the multiplying digital-to-analog converter 80. The output of the converter 80 is thereby an amplitude modulated (or enhanced) sampled clipped speech signal S8, shown in FIG. 4H, referred to as AE-SCS. At this point, the AE-SCS signal corresponds to a differentiated speech signal because the encoder has performed a differentiation function prior to clipping and prior to envelope tracking and digitizing. The output signal from the converter 80 is directed to an integrator circuit 90 which removes any D.C. component from the signal and shapes the signal by an integration process which compensates for the differentiation process performed in the encoder. The output signal from the integrator 90 is then directed to a low pass filter 100 which removes signal frequency components above about 3800 Hz. The output of the low pass filter 100 is the reconstructed version of the audio input signal S9, shown in FIG. 4I. That signal at this point may be directed to an audio amplifier and speaker for immediate review or it may be stored for future use or analysis.

Figure 5A:
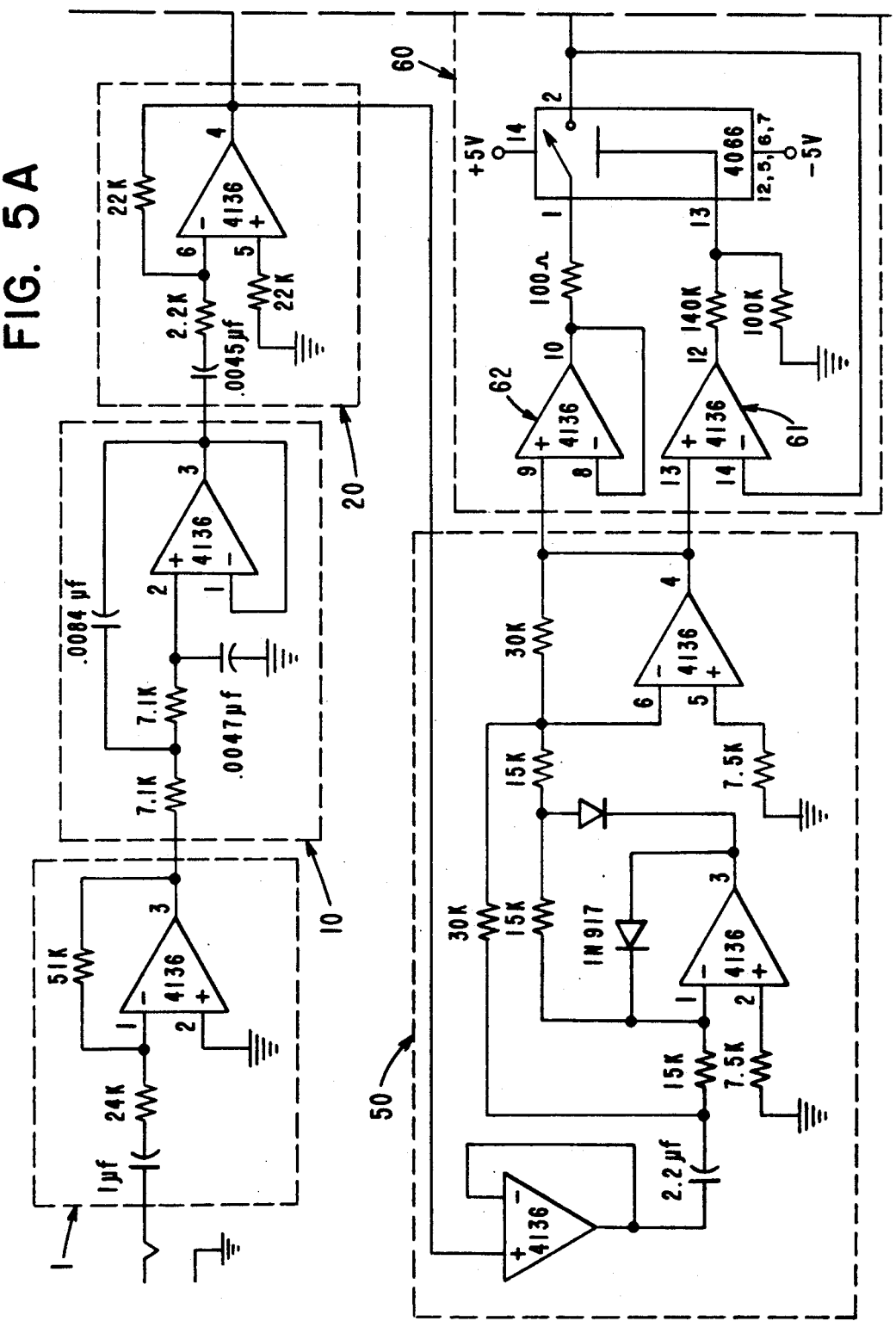
FIGS. 5A-5B illustrate, in circuit diagram form, an implementation of the encoder of FIG. 1.
Figure 5B:
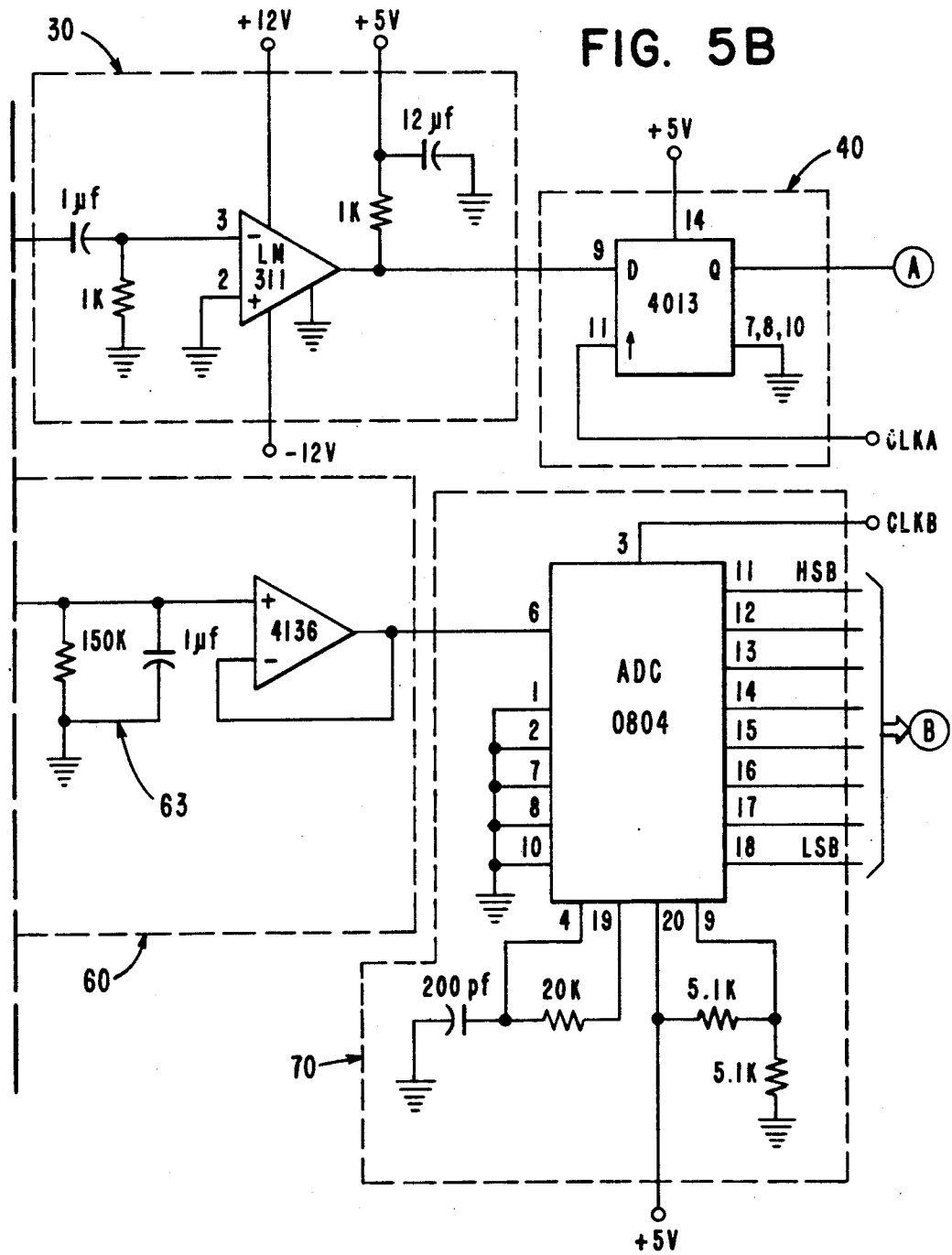

Referring now to FIGS. 5A and 5B, wherein a circuit diagram of the encoder is shown (minus the clocking circuit 110), an audio input speech signal, 2 volts peak-to-peak, is applied to the input of the audio amplifier 1. The amplifier 1 uses a Fairchild uA4136 operational amplifier and provides isolation and gain adjustment for the next stage, low pass filter 10, to which the output of the amplifier is directed. In the preferred embodiment, the low pass filter 10 consists of a two pole Butterworth active filter having a 3 dB cutoff frequency of about 3800 Hz, which was found to provide adequate out of band rejection for the environment in which the system was tested. The output of the filter 10 is directed to the differentiator circuit 20, which is a single pole high pass filter having a 3 dB corner frequency at 16 kHz and a gain of 10. The output of the differentiator 20 is directed to the input of the clipping circuit 30 and to the input of the full-wave rectifying circuit 50. These two separate signal paths will be described in turn.

The clipping circuit 30 in the preferred embodiment of the invention is comprised of an LM311 comparator connected as shown (FIG. 5B). A 1 uf capacitor and a 1K ohm resistor circuit on the front end of clipping circuit 30 are used to block D.C. A 1K ohm pull-up resistor is used on the output end of the clipping circuit to adjust its output voltage to logic levels, approximately 0 to 5 volts, for compatibility with the following D-type flip-flop. The digitizer circuit 40 performs uniform sampling of the clipping circuit output, thereby providing the digitized output signal to the first encoder output terminal Ⓐ. The signal will be referred to as the sampled clipped speech (SCS). The digitizer 40 consists of a CMOS 4013 D-type positive edge triggered flip-flop which samples the clipper output at a uniform rate determined by the clock signal CLKA provided by clock circuit 110, described later.

Referring back to the full-wave rectifier 50 (FIG. 5A), the rectifier is comprised of three 4136 operational amplifiers, connected as shown, with diodes to perform a linear full-wave rectification on the signal received from the output of the differentiator 20. The output of the full-wave rectifier circuit 50 is directed to the envelope tracker circuit 60 which has as its central element a bilateral switch 4066 manufactured by National Semiconductor. If the input signal voltage of the tracker circuit exceeds the output of the tracker circuit (sensed by an operational amplifier 61), then the input (buffered by the operational amplifier 62) is switched into a charging circuit 63 on the output (FIG. 5B), causing the tracker circuit output to rise toward the input level with a time constant of about 10 microseconds. If the input voltage of the tracker circuit 60 falls below the output voltage, then the charging circuit 63 is switched out of the circuit path of operational amplifier 62, and the output is allowed to discharge and fall at a time constant of about 15 milliseconds. The envelope tracker circuit 60 thus provides a fast attack and slow decay envelope output which is directed to the input of the analog-to-digital converter circuit 70 which uniformly samples the envelope signal. In the preferred embodiment, the converter circuit 70 consists of an 8bit successive approximation analog-to-digital converter device ADC 0804 manufactured by National Semiconductor. The output of the converter circuit 70 is presented on 8 bit lines which are coupled to the second encoder output terminal Ⓑ. The preferred embodiment utilizes 8 bits without companding (or 7 bits if the multiplexer/demultiplexer of FIGS. 2, 7A-7D), but fewer or more bits may be used and companding may be included without detracting from the present invention. The sampling rate of the converter circuit 70 is determined by the clock signal CLKB, of 300 Hz or more, provided by clock circuit 110.

Figure 6:
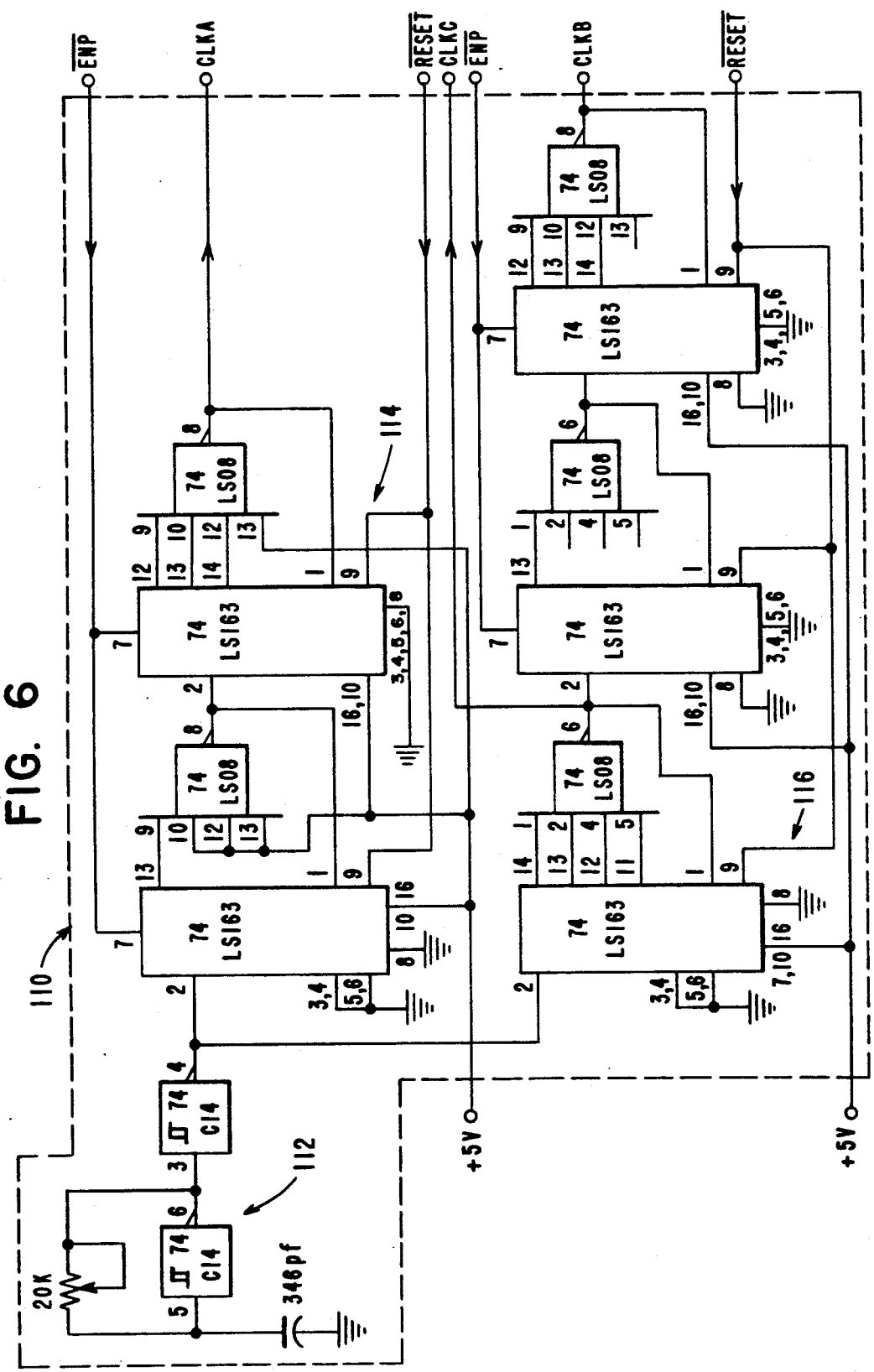
FIG. 6 illustrates, in circuit diagram form, the clock generator portion of the encoder implementation of FIG. 1.
Figure 7A:
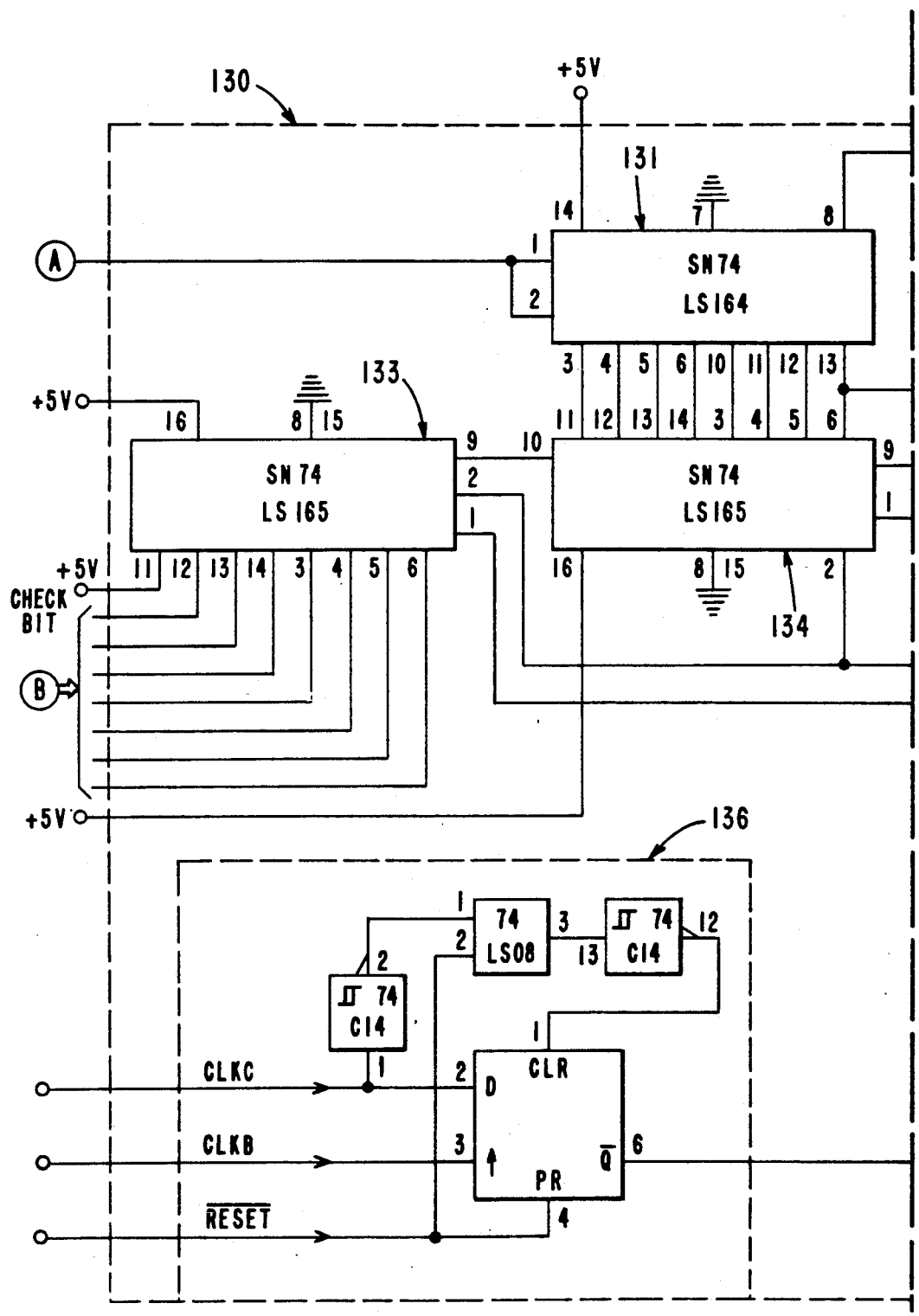
FIGS. 7A-7D illustrate, in circuit diagram form, an implementation of the multiplexer/demultiplexer of FIG. 2.
Figure 7B:
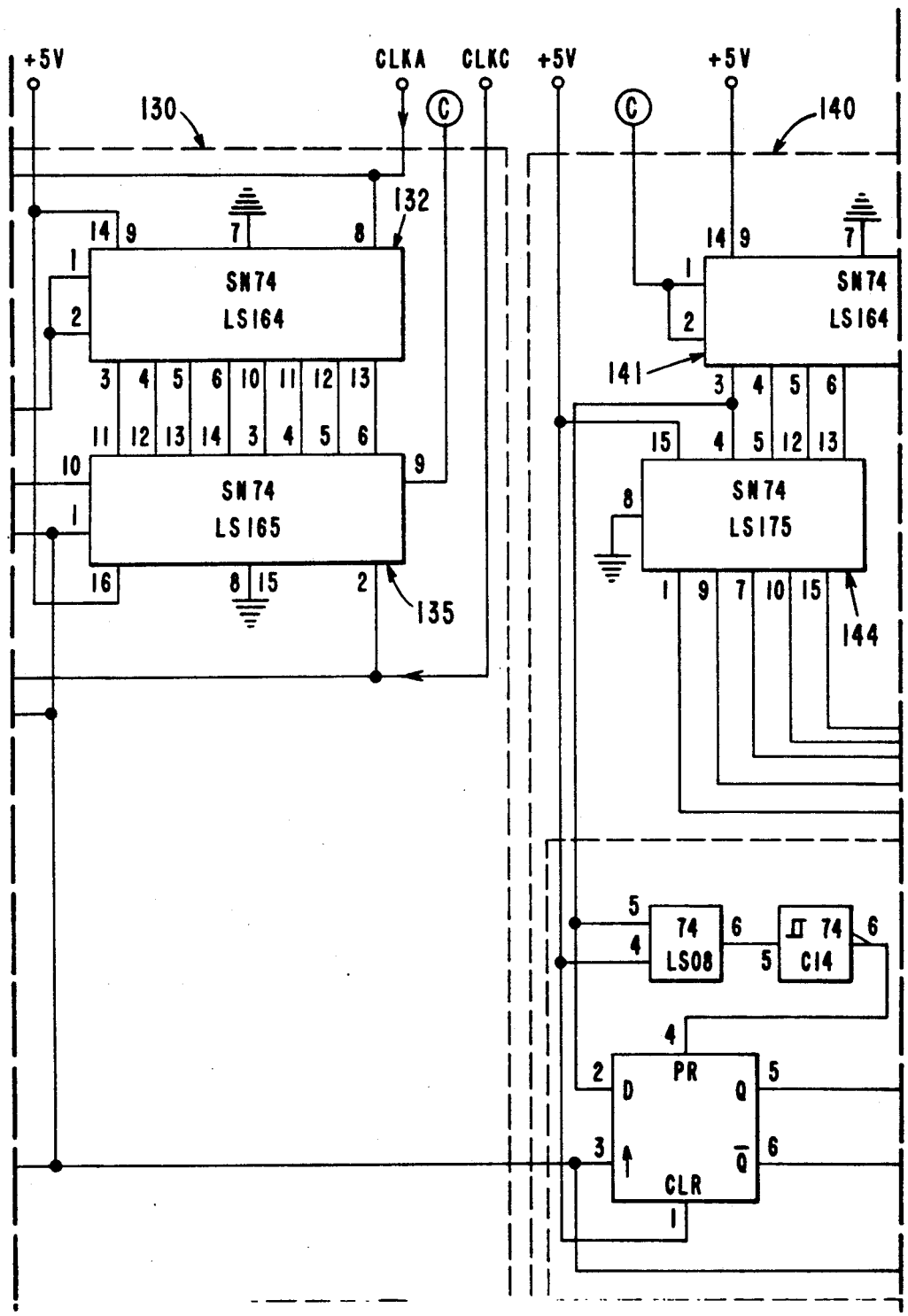
Figure 7C:
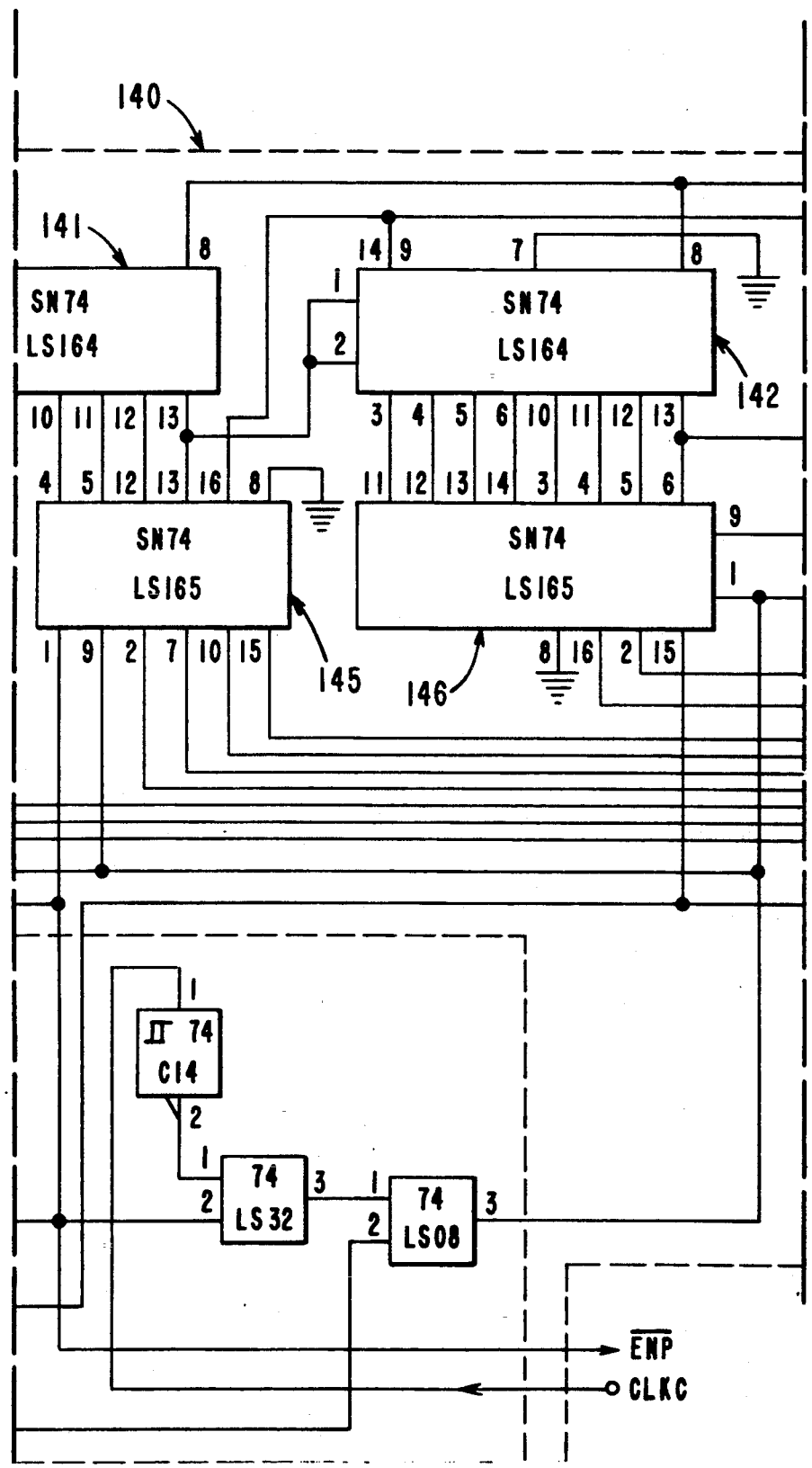
Figure 7D:
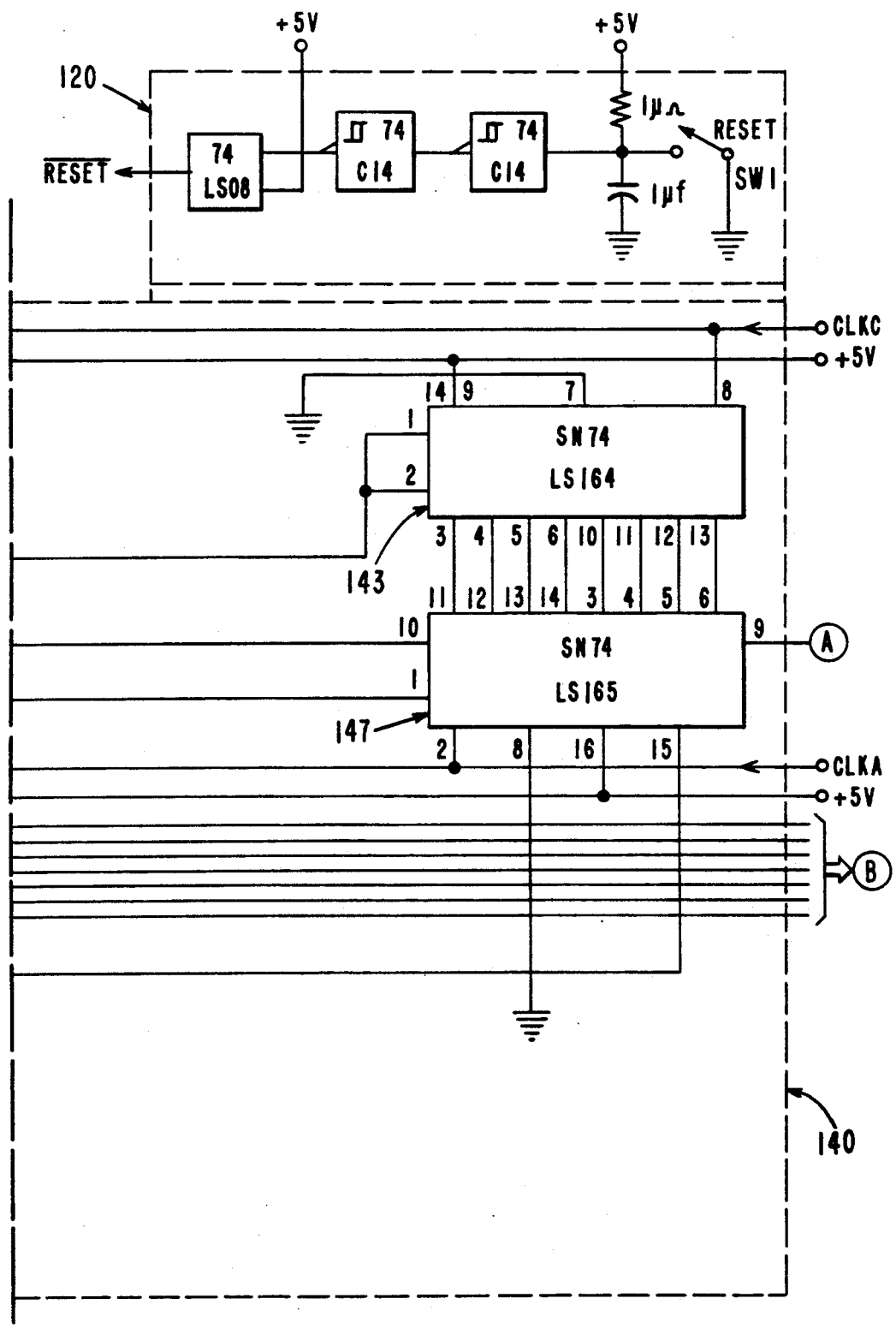

Referring to FIG. 6, the clock circuit 110 consists of an oscillator 112 formed by two 74C14 Schmitt triggers and of two banks of synchronous down counters 114 and 116 formed with 74LS163 and 74LS08 chips which divide the oscillator frequency and produce the three clock signals CLKA, CLKB, and CLKC. The signal $\overline{\text{ENP}}$ is generated by the circuit 148 of FIGS. 7B and 7C.

Referring now to FIGS. 7A-7D, wherein the circuit diagram of the multiplexer/demultiplexer 130/140 is shown, the power-up reset function is accomplished by a manually operated reset circuit 120. Depressing switch SW1 causes the $\overline{\text{RESET}}$/pulse to appear at the output of a 74LS08 gate. The multiplexer 130 receives the two output signals from the first and the second encoder terminals Ⓐ and Ⓑ, respectively. The first serial bit stream signal is fed into serial-in, parallel-out, shift registers 131 and 132 as shown. The shift registers consist of SN74LS164 devices of the type manufactured by Texas Instruments. These registers are shifted by the rising edge of the clock signal CLKA. The parallel outputs of the registers 131 and 132 are connected to the parallel inputs of parallel-in, serial-out registers 134 and 135 as shown. The parallel loading of data is controlled by the output of a logic network 136 to avoid race conditions. The multiplexer 130 receives the signal on the input terminal Ⓑ from the encoder into the parallel-in, serial-out register 133 as shown. Note that in this implementation, only 7 bit PCM is accomodated; thus, the seven most significant bits from the encoder A/D converter 70 of FIG. 5B are used as inputs to the multiplexer register 133. The eighth bit of this register is tied high and is used as a check bit for synchronizing the demultiplexer, explained later. The parallel loading of data into register 133 is controlled by the logic network 136 mentioned previously. In the implementation shown, a parallel loading of data in registers 133, 134 and 135 occurs after receiving every 16 bits of the signal on the input terminal Ⓐ. After each loading of the registers 133, 134 and 135, the data is shifted serially out by the clock CLKC, whose frequency is equal to the frequency of CLKA plus 8 times the frequency of CLKB. In this way, a steady serial bit stream, appearing at the terminal Ⓒ, is produced as the single channel output of the multiplexer. The output serial bit stream would typically be applied to a serial input port of a computer system for digital storage or analysis, as illustrated in FIG. 2. At some time later, the demultiplexer circuit 140 may retrieve the digital signal, at the input terminal Ⓒ, from the computer system via a serial port, which is clocked out by the applied clock signal CLKC from the demultiplexer. The retrieved bit stream is then fed to serial-in, parallel-out shift registers 141, 142 and 143 as shown. The registers are shifted by the rising edge of clock CLKC. The data of these registers is parallel loaded, as shown, into nontransparent latches 144 and 145 and shift registers 146 and 147. The loading is controlled by the logic network 148 which checks to see if there is a high bit value on pin 3 of register 141 just after the rising edge of clock CLKB. If the checked bit is low, then the data is not aligned according to the multiplexer format and so the logic network disables registers 144, 145, 146 and 147 until the checked bit becomes high. In this way, the demultiplexer can eventually recover data synchronization if it is ever lost. If the checked bit is high, then the network issues a load signal to the registers 144, 145, 146 and 147, and enables their inputs. The seven parallel output bits of latches 144 and 145 correspond to the binary value of the signal applied to the terminal Ⓑ. The serial output of the shift registers 147, clocked by CLKA, is the serial bit stream corresponding to the signal applied to the terminal Ⓐ.

Figure 8:
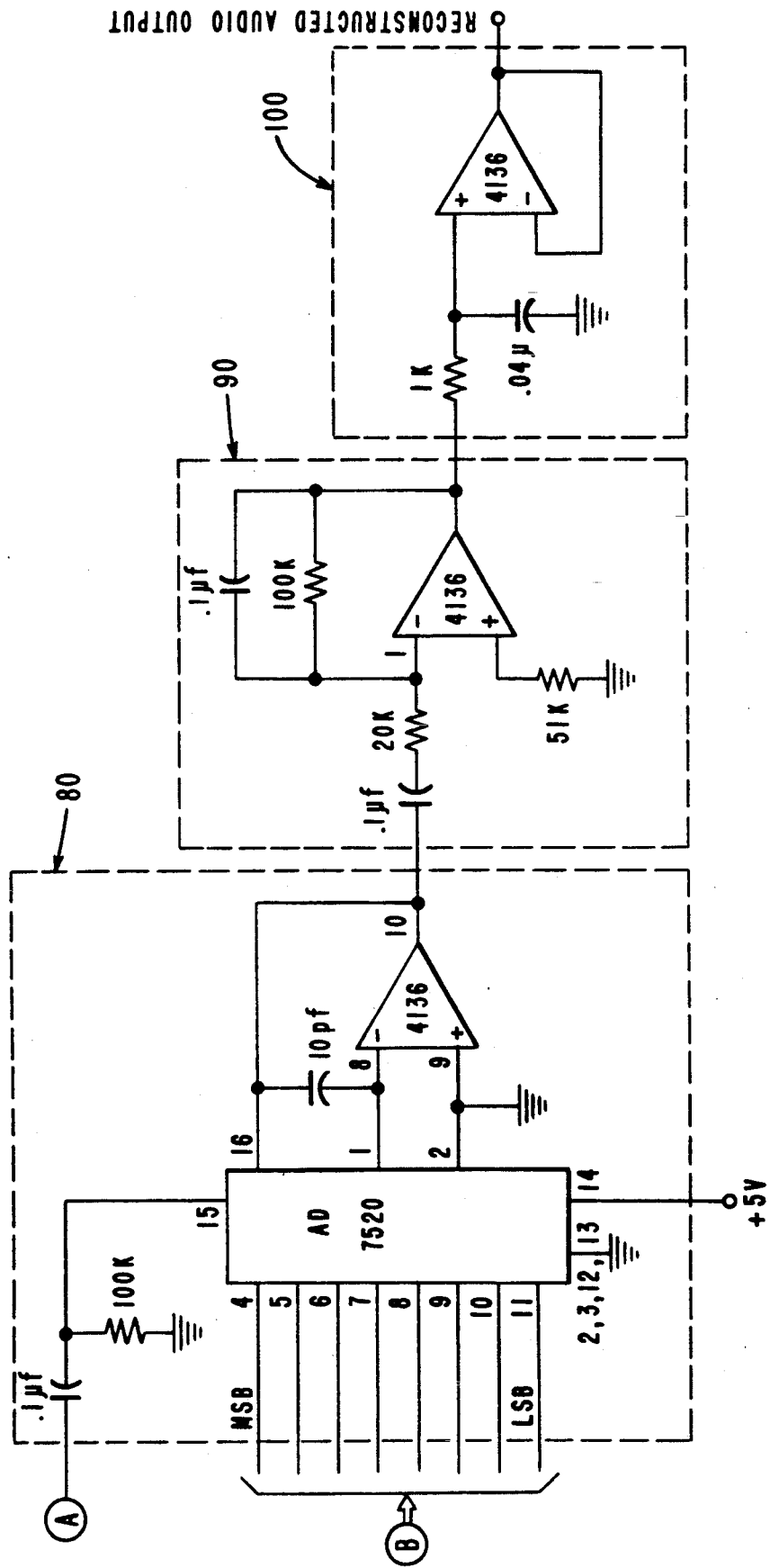
FIG. 8 is a diagram of an implementation of the decoder of FIG. 3.

Referring now to FIG. 8, wherein a circuit diagram of the decoder is shown, the two signals appearing at the terminals Ⓐ and Ⓑ are received by a multiplying digital-to-analog converter circuit 80 comprised of an AD7520 device manufactured by National Semiconductor and an operational amplifier 4136. The signal at the terminal Ⓐ is the sampled clipped speech signal and is used as the analog reference to pin 15 of the AD7520 device, after having its D.C. component removed by an input RC filter formed by the 0.1 uf capacitor and the 100K resistor. The 8 bit lines representing the binary value of the speech amplitude envelope, are directed to pins 4 through 11 of the AD7520 device as shown. (Note, however, that if the multiplexer/demultiplexer of FIG. 6 is used, then the signal on the terminal Ⓑ consists of only 7 bit PCM and so pin 11 of AD7520 is tied low.) The operational amplifier 4136 is connected as shown to provide the output signal from the converter circuit 80, which is an amplitude enhanced form of the sampled clipped speech signal. The output signal from circuit 80 is directed to the integrator circuit 90 which is an active low pass filter that also blocks D.C. and suppresses frequencies below about 80 Hz. The active element of the circuit 90 is a an operational amplifier 4136. The integration function is performed in the circuit by providing a −6 dB per octave slope across the speech band frequencies above about 160 Hz. The output of integrator circuit 90 is directed to circuit 100 which is a single pole unity gain active low pass filter with a 3 dB corner frequency of 4000 Hz that utilizes an operational amplifier 4136. The output from the low pass filter 100 is the reconstructed audio system signal.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as fall within the true scope of the invention.

We claim:

1. An encoder comprising:
 a) a first signal path for processing an analog signal;
 b) a low pass filter means interposed in said first signal path for filtering the analog signal, said filter means having nominally a unity gain in the bandpass of said filter;
 c) a differentiator means interposed in said first signal path for differentiating the filtered signal;
 d) a clipper means interposed in said first signal path for clipping said differentiated signal to provide a clipped signal;
 e) a digitizer means interposed in said first signal path for converting said clipped signal to a first digitized output signal;
 f) a second signal path for processing the differentiated signal;
 g) a rectifying means interposed in said second signal path for rectifying the differentiated signal;
 h) a means interposed in said second signal path for providing an amplitude signal which is a function of the amplitude of the rectified signal; and
 i) a converter means interposed in said second signal path for receiving the amplitude signal and for converting the amplitude signal to a second digitized output signal so as to provide with said first and said second output signals an improved digital representation of the analog signal.

2. The encoder according to claim 1 and further comprising:
 an amplifier means interposed in said first signal path for amplifying the analog signal, and for coupling the amplified signal to the input of said low pass filter means, 3. The encoder according to claim 1 and further comprising:
 a clock generator means for generating a first clock signal for clocking said digitizer means at a first rate, and for generating a second clock signal for clocking said converter means at a second rate which is lower than the first rate.

4. A decoder comprising:
 a) a digital-to-analog converter means having a first input for receiving a first digitized signal, which signal is a clipped signal representation of an analog signal, and a second input for receiving a second digitized signal, which signal represents the amplitude variations of the analog signal, said converter means converting the first digitized signal to an amplitude modulated signal as a function of the second digitized signal and for providing said signal at an output;
 b) an integrator for receiving the amplitude modulated signal and for providing as an output signal a shaped signal having minimum D.C. components; and
 c) a filter coupled to said integrator for removing high frequency components from the provided output signal to provide a reconstructed analog signal, said filter having nominally a unity gain in its bandpass.

5. An analog signal encoding and decoding system comprising:
 a) a first signal path for processing an analog signal;
 b) a low pass filter means interposed in said first signal path for filtering the analog signal, said filter means having nominally a unity gain in the bandpass of said filter;
 c) a differentiator means interposed in said first signal path for differentiating the filtered signal;

d) a clipper means interposed in said first signal path for clipping said differentiated signal to provide a clipped signal;
e) a digitizer means interposed in said first signal path for converting said clipped signal to a first digitized output signal;
f) a second signal path for processing the differentiated signal;
g) a rectifying means interposed in said second signal pth for rectifying the differentiated signal;
h) a means interposed in said second signal path for providing an amplitude signal which is a function of the amplitude of the rectified signal;
i) a converter means interposed in said second signal path for receiving the amplitude signal and for converting the amplitude signal to a second digitized output signal;
j) a storage means for receiving and for storing said first and said second digitized output signals;
k) a digital-to-analog converter means having a first input coupled to said storage means for receiving said first digitized signal, and a second input coupled to said storage means for receiving said second digitized signal, said converter means for converting said first digitized signal to an amplitude modulated signal as a function of said second digitized signal and for providing said signal at an output; and
l) a means coupled to the output of said digital-to-analog converter for shaping and filtering said provided signal to provide a reconstructed analog signal.

6. The analog signal encoding and decoding system according to claim 5 and further comprising:
an amplifier means interposed in said first signal path for amplifying the analog signal, and for coupling the amplified signal to the input of said low pass filter means.

7. The analog signal encoding and decoding system according to claim 5 and further comprising:
a clock generator means for generating a first clock signal for clocking said digitizer means at a first rate, and for generating a second clock signal for clocking said converter means at a second rate which is lower than the first rate.

8. An analog signal encoding and decoding system comprising:
a) a first signal path for processing an analog signal;
b) a low pass filter means interposed in said first signal path for filtering the analog signal, said filter means having nominally a unity gain in the bandpass of said filter;
c) a differentiator means interposed in said first signal path for differentiating the filtered signal;
d) a clipper means interposed in said first signal path for clipping said differentiated signal to provide a clipped signal;
e) a digitizer means interposed in said first signal path for converting said clipped signal to a first digitized output signal;
f) a second signal path for processing the differentiated signal;
g) a rectifying means interposed in said second signal path for rectifying the differentiated signal;
h) a means interposed in said second signal path for providing an amplitude signal which is a function of the amplitude of the rectified signal;
i) a converter means interposed in said second signal path for receiving the amplitude signal and for converting the amplitude signal to a second digitized output signal;
j) a transmission means for receiving and for transmitting said first and said second digitized output signals to a decoder; and
k) a decoder means coupled to said transmission means for receiving said first and said second digitized output signals, said decoder means comprising:
  1) a digital-to-analog converter means having a first input for receiving said first digitized signal, and a second input for receiving said second digitized signal, said converter means converting said first digitized signal and to an amplitude modulated signal as a function of said second digitized signal and providing said signal at an output; and
  2) a means coupled to the output of said digital-to-analog converter for shaping and filtering said provided signal to provide a reconstructed analog signal.

9. The analog signal encoding and decoding system according to claim 8 and further comprising:
an amplifier means interposed in said first signal path for amplifying the analog signal, and for coupling the amplified signal to the input of said low pass filter means.

10. The analog signal encoding and decoding system according to claim 8 and further comprising:
a clock generator means for generating a first clock signal for clocking said digitizer means at a first rate, and for generating a second clock signal for clocking said converter means at a second rate which is lower than the first rate.

11. An encoder comprising:
a) a receiving means for receiving an audio input signal and generating a differentiated analog signal;
b) a clipping means coupled to said receiving means for clipping said analog signal to provide a clipped signal;
c) a digitizer means coupled to said clipping means for converting said clipped signal to a first digitized output signal;
d) a rectifier means coupled to said receiving means for rectifying the analog signal;
e) an envelope tracker means coupled to said rectifier means for receiving the rectified analog signal and for providing an output signal which is a function of the amplitude of the rectified analog signal; and
f) an analog-to-digital converter means for converting the output signal from said envelope tracker means to a second digitized output signal.

12. The encoder according to claim 11 wherein said receiving means further comprises:
a) an amplifier means for amplifying said audio input;
b) a low pass filter means coupled to said amplifier for filtering the amplified analog signal, said filter means having nominally a unity gain in the bandpass of said filter; and
c) a differentiator means for differentiating the filtered signal from the low pass filter to provide said differentiated analog signal that is coupled to the output of said clipping means.

13. The encoder according to claim 11 and further comprising:

a clock generator means for generating a first clock signal for clocking said digitizer means at a first rate and a second clock signal for clocking said analog-to-digital converter means at a second rate which is lower than the first rate.

14. A decoder comprising:
   a) a multiplying digital-to-analog converter means having two inputs, one adapted to receive a first digitized signal which signal is a digitized clipped signal representation of an analog signal, and the other adapted to receive a second digitized signal which signal represents a digitized envelope of the analog signal, said converter means adapted to convert the first digitized signal to an amplitude modulated signal as a function of the second digitized signal; and
   b) an integrator for receiving the amplitude modulated signal and for providing as an output signal a shaped signal having minimum D.C. components; and
   c) a filter coupled to said integrator for removing high frequency components from the provided output signal to provide a reconstructed analog signal, said filter having nominally a unity gain in its bandpass.

15. A method of encoding an analog signal comprising the steps of:
   a) filtering the analog signal with a nominally a unity gain in the bandpass of the filter;
   b) differentiating the filtered signal;
   c) amplitude clipping the differentiated analog signal;
   d) digitizing the clipped analog signal to provide a first digitized output signal;
   e) rectifying the differentiated analog signal to provide a rectified analog signal;
   f) forming an envelope signal which is a function of the amplitude of the rectified analog signal; and
   g) digitizing the envelope signal to provide a second digitized output signal which represents the amplitude components of the analog signal.

16. The method of decoding a first and a second digital signal, the first digital signal being a digitized clipped analog signal and the second digital signal being a digitized amplitude modulated signal which together represent an analog signal, comprising the steps of:
   a) converting the first digitized signal into an amplitude modulated digital signal as a function of the second digitized signal;
   b) integrating the amplitude modulated signal and providing as an output signal a shaped signal having minimum D.C. components; and
   c) filtering the provided output signal to remove high frequency components while maintaining nominally a unity gain in its bandpass and providing a reconstructed analog signal.

17. A method of digitally processing an audio signal with improved dynamic range comprising the steps of:
   a) filtering the audio signal with a nominally a unity gain in the bandpass of the filter;
   b) differentiating the filtered signal;
   c) clipping the differentiated audio signal;
   d) digitizing the clipped audio signal to provide a first digitized clipped signal;
   e) rectifying the differentiated audio signal;
   f) generating a signal which is a function of the envelope of the rectified audio signal; and
   g) digitizing the generated signal to provide a second digitized signal having amplitude components so as to provide with said first and said second signals an improved digital representation of the audio signal.

18. The method of claim 17 and further comprising the step of:
   amplifying the audio signal prior to the filtering step a).

19. The method of claim 17 wherein digitizing the clipped audio signal in step d) and the generated signal in step g) are performed at different rates.

20. A method of encoding and decoding an analog signal comprising the steps of:
   a) filtering and analog signal with nominally a unity gain in the bandpass of the filter;
   b) differentiating the filtered signal;
   c) amplitude clipping the differentiated analog signal;
   d) digitizing the clipped analog signal to provide a first digitized output signal;
   e) rectifying the differentiated analog signal to provide a rectified analog signal;
   f) forming an envelope signal which is a function of the amplitude of the rectified analog signal;
   g) digitizing the envelope signal to provide a second digitized output signal which represents the amplitude components of the analog signal;
   h) storing said first and said second digitized output signals;
   i) converting the stored first digitized signal into an amplitude modulated digital signal as a function of the second digitized signal; and
   j) signal shaping and filtering the amplitude modulated digital signal to provide a reconstructed analog signal.

21. The method of claim 20 and further comprising the step of:
   amplifying the analog signal prior to the filtering step a).

22. The method of claim 20 wherein digitizing the clipped analog signal in step d) and the generated signal in step g) are performed at different rates.

23. The method of claim 20 wherein said step j) comprises the steps of:
   integrating the amplitude modulated signal and providing as an output signal a shaped signal having minimum D.C. components; and
   filtering the provided output signal to remove high frequency components while maintaining nominally a unity gain in its bandpass and providing a reconstructed analog signal.

24. A method of encoding an analog signal comprising the steps of:
   a) filtering the analog signal with a nominally a unity gain in the bandpass of the filter;
   b) differentiating the filtered signal;
   c) amplitude clipping the differentiated analog signal;
   d) digitizing the clipped analog signal to provide a first digitized output signal;
   e) rectifying the differentiated analog signal to provide a rectified analog signal;
   f) forming an envelope signal which is a function of the amplitude of the rectified analog signal;
   g) digitizing the envelope signal to provide a second digitized output signal which represents the amplitude components of the analog signal;
   h) transmitting said first and said second digitized output signals;

i) receiving and converting the first digitized signal into an amplitude modulated digital signal as a function of the second digitized signal; and j) signal shaping and filtering the amplitude modulated digital signal to provide a reconstructed analog signal.

25. The method of claim 24 and further comprising the step of:

amplifying the analog signal prior to the filtering step a).

26. The method of claim 24 wherein digitizing the clipped analog signal in step d) and the generated signal in step g) are performed at different rates.

27. The method of claim 24 wherein said step j) comprises the steps of:

integrating the amplitude modulated signal and providing as an output signal a shaped signal having minimum D.C. components; and filtering the provided output signal to remove high frequency components while maintaining nominally a unity gain in its bandpass and providing a reconstructed analog signal.

* * * * *